Dec. 1, 1970   R. F. BARDSLEY ET AL   3,543,411
TUBULAR FREEZE-DRYING CONDENSER
Filed Nov. 29, 1968   3 Sheets-Sheet 1

INVENTORS.
ROBERT F. BARDSLEY
HARVEY S. BOWER
SAUL KATZ

INVENTORS.
ROBERT F. BARDSLEY
HARVEY S. BOWER
SAUL KATZ

INVENTORS.
ROBERT F. BARDSLEY
HARVEY S. BOWER
SAUL KATZ

United States Patent Office 3,543,411
Patented Dec. 1, 1970

3,543,411
TUBULAR FREEZE-DRYING CONDENSER
Robert F. Bardsley, Harrington Park, and Harvey S. Bower, Upper Saddle River, N.J., and Saul Katz, Monsey, N.Y., assignors to General Foods Corporation, White Plains, N.Y., a corporation of Delaware
Filed Nov. 29, 1968, Ser. No. 779,907
Int. Cl. F26b 13/30
U.S. Cl. 34—92                                    12 Claims

ABSTRACT OF THE DISCLOSURE

An improved freeze drying condenser consisting of a set of tubes mounted internally in a freeze drying chamber. The condenser is compact and capable of handling the large peak loads experienced in a batch freeze drying cycle. The efficiency, as compared to horizontal tubes, is improved by raising the discharge end of the tubes from the horizontal or by other means of increasing the volume of liquid within the tubes in order to achieve more uniform wetting of the tubes.

BACKGROUND OF THE INVENTION

This invention relates to a condenser mounted internally in a vacuum freeze drying chamber. The condenser is tubular in design.

As freeze drying is a relatively expensive method of producing dehydrated products, it is essential in the production of large volume, relatively low cost products (e.g. freeze dried coffee) to obtain maximum productivity with a minimum investment in equipment and with a minimum of operating personnel. Therefore, when using a batch freeze drying system with internal condensers it is desirable to dry as large a batch of product as possible in the shortest possible time consistent with product quality. Design of the internal condenser is critical in order to achieve a balance between the volume of the chamber occupied by the condenser and the condensation rate needed to support the drying process. When a batch of product is freeze dried in a vacuum chamber, the sublimation rate is very rapid during the initial drying period and gradually falls off as the ice layer recedes from the surface of the product. Therefore, the condenser must have the capacity to support the drying process during the initial drying period, but it would be permissible for the capacity of the condenser to decrease as the drying cycle progressed, as long as the condensing capacity remained capable of handling the amount of sublimed vapors emitting from the product at all points in the drying cycle.

The fan-shaped, plate condenser described in U.S. Pat. 3,132,930 represented an advance in the design of internal condensers, but was inadequate in several critical areas. The ice buildup on the plates was uneven indicating that the entire condensing surface was not being utilized efficiently. Plugging of orifices in refrigerant lines servicing the condenser plates further reduced the efficiency and resulted in lengthy shutdowns while refrigeration lines were physically dismantled and cleared. Water vapors were found to bypass the condenser plates and these vapors fouled the oil in the vacuum pumps causing further inefficiencies in operation and requiring the use of more vacuum equipment and longer drying cycles.

Many of the deficiencies noted with the fan-shaped, plate condensers were overcome by the condenser described in pending application Ser. No. 668,229. The condenser consists of sets of tubes mounted internally on either side of a vacuum chamber. The tubes extend in a horizontal plane, longitudinally from the front to the rear of the chamber. The tubular condenser represent a significant improvement over plates as the ice buildup is more uniform and in a given volume, the tubes can condense significantly more vapors than the plate condensers. Also, a baffle arrangement was provided which created a secondary condensing zone that provided the vacuum pumps protection from exposure to excessive vapors, and the refrigerant was fed into the condenser tubes via feed tubes which eliminated shutdowns due to plugged orifices found in conventional condenser systems.

While the tubular condenser represented a very significant improvement in internal condensers for vacuum freeze dryers, there remained the need to further increase the condenser capacity in a given volume of chamber space in order to allow still larger product loads to be freeze dried in shorter times, thus further reducing the operating costs of a freeze drying system. Also, while the ice buildup on the tubes was significantly more uniform than on condenser plates, there was obviously room for improvement.

SUMMARY

This invention relates to an improved, internal condenser for a vacuum freeze drying chamber and more particularly to a means for achieving a more uniform tube temperature across the entire tube surface thus increasing the capacity of the condenser by obtaining a more uniform distribution of ice on the surface of the condenser. The invention is particularly useful when adapted to an internal condenser such as the condenser described in pending application Ser. No. 668,229.

The object of this invention is to provide a condenser capable of handling increased vapor loads, per volume of space occupied by the condenser, so that the productivity of a batch freeze dryer can be maximized.

A further object of this invention is to reduce the amount of refrigerant which must be pumped through a given condenser to handle a particular refrigeration load.

DESCRIPTION OF THE DRAWINGS

FIG. 3 is a longitudinal fragmented view of one row of condenser tubes showing the arrangement of feed tubes within the condenser tubes with the tubes installed on an incline.

FIG. 4 is a longitudinal fragmented view of one row of condenser tubes showing a weir installed on the discharge end of the tubes.

FIG. 5 is a longitudinal fragmented view of one row of condenser tubes showing the discharge end of the tube rising in a vertical direction.

The more detailed description of the drawings following will further clarify the invention.

Figure 1:
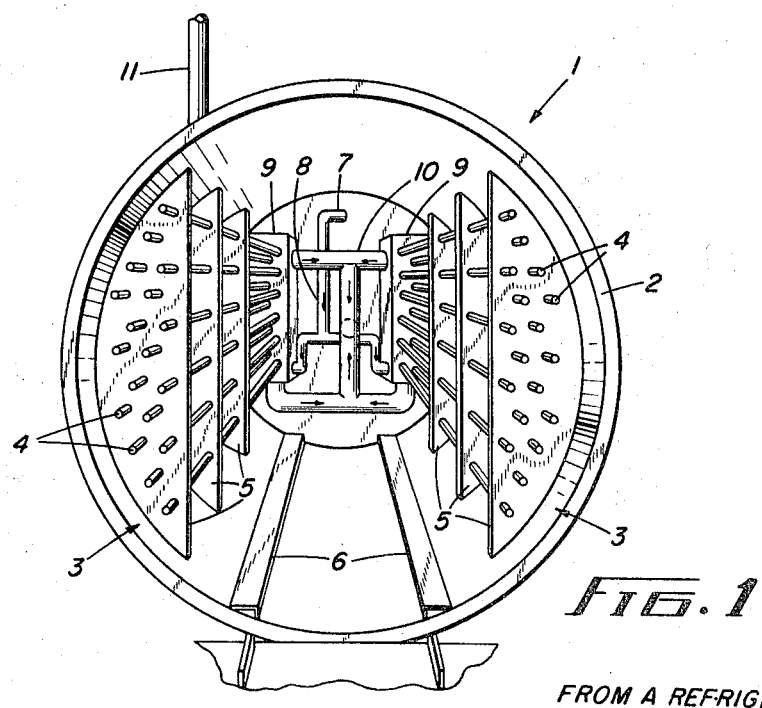
FIG. 1 is a front end perspective view of a cylindrical vacuum chamber containing the condenser of this invention.

FIG. 1 shows an end perspective of a cylindrical vacuum chamber 1 from the front with a door (not shown) open. The front edge of the chamber 2 is a flat, circular flange surface against which the door can be seated to seal the chamber. Within the chamber are two sets 3 of condenser tubes 4 mounted in tube supports 5 on either side of the chamber. The sets are spaced so that a cart containing product can be moved into the chamber on the tracks 6 located at the bottom of the chamber. The refrigerant inlet line 7 is connected to an internal refrigerant inlet header 8 through which refrigerant flows to inlet risers. Refrigerant from the condenser tubes passes through the outlet risers 9 which are connected by a refrigerant outlet header 10. The vacuum line 11 connects the chamber end to the vacuum pumps.

Figure 2:
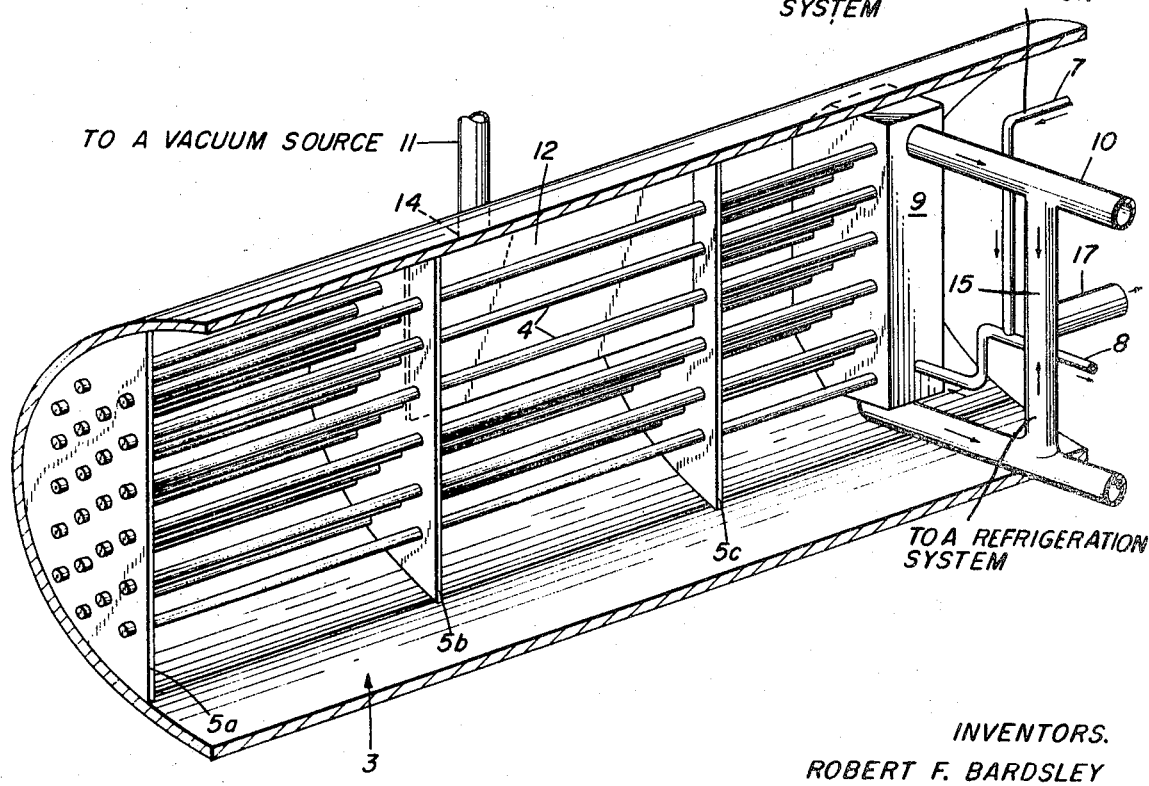
FIG. 2 is a longitudinal segmented view of a chamber showing one set of condenser tubes and how the tubes connect with the refrigeration piping at the rear of the chamber.

FIG. 2 is a longitudinal segment of the chamber 1 and one set 3 of condenser tubes 4 showing three tube supports 5a, b, c. Tube support 5a shows how the supports may be mounted flush against the chamber wall. A baffle plate 12 is shown mounted vertically between the outer two vertical rows of condenser tubes. The baffle plate extends vertically down from the wall of the chamber past half of the tubes in a vertical row and the plate extends longitudinally to make contact with tube supports 5b and 5c. The tubes between tube supports 5b and 5c behind the baffle plate are in the secondary condensing zone. The vacuum line 11 enters the chamber at the opening 14 through the chamber wall above the secondary condensing zone. At the rear of the chamber 1, the condenser tubes 4 are shown passing into a refrigeration outlet riser 9. The outlet riser is connected to the refrigerant outlet line 15 by an outlet header 10. The refrigerant inlet line 7 is shown connected to the inlet header 8 which passes into the outlet riser 9 wherein the inlet risers are located.

Figure 3:
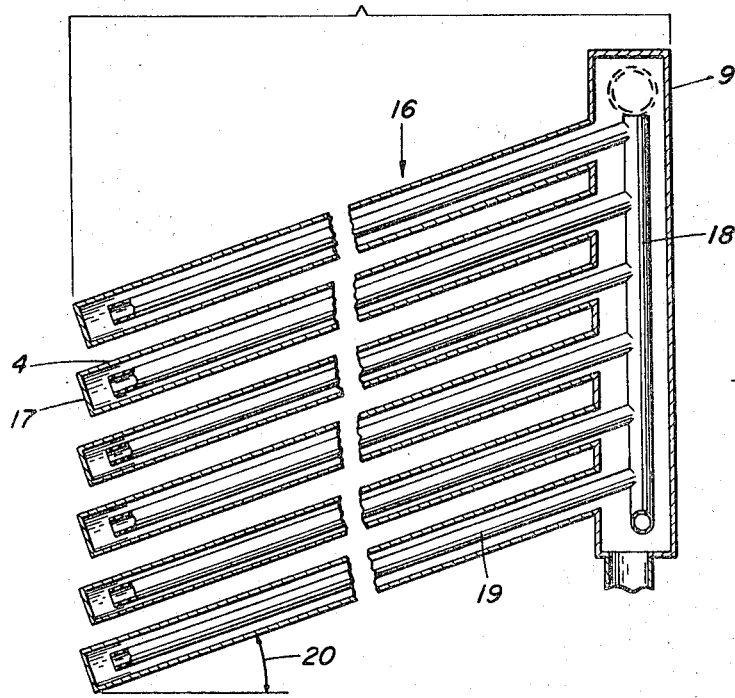
FIGS. 3, 4 and 5 are different embodiments of the equipment of this invention.

FIG. 3 is a longitudinal fragmented view of one vertical row 16 of six condenser tubes 4 closed at the front end 17 and opening into the outlet riser 9 at the other end. One inlet riser 18 is shown within the outlet riser with feed tubes 19 running concentrically within the condenser tubes from the inlet riser to the front end of the condenser tubes. The inlet end of the condenser tubes 4 are lower than the discharge end and the tubes are at an angle 20 with the horizontal.

Figure 4:
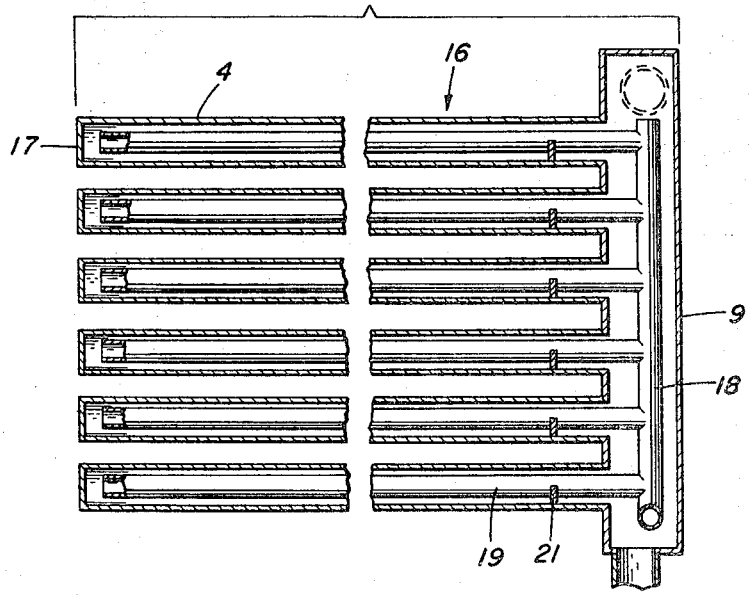

FIG. 4 is the same view of one vertical row 16 of six condenser tubes 4 as shown in FIG. 3. The tubes 4 extend longitudinally on a horizontal plane. At the discharge end of the tube a weir 21 has been inserted.

Figure 5:
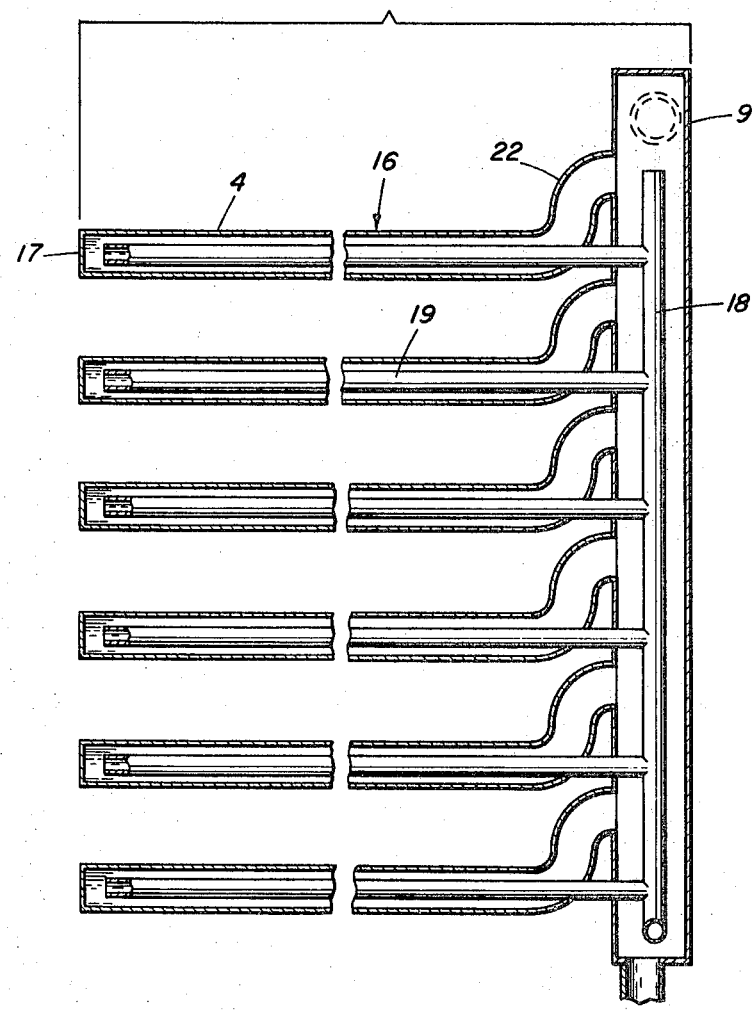

FIG. 5 is the same view of one vertical row 16 of six condenser tubes 4 as shown in FIGS. 3 and 4. The tubes extend longitudinally on a horizontal plane. The discharge end of the tubes rise vertically 22 prior to opening into the outlet riser 9.

DESCRIPTION OF THE PREFERRED EMBODIMENT

On internal condenser for a batch, vacuum freeze drying chamber comprising two sets of tubes mounted at the sides of the chamber with the condensing tubes extending longitudinally inside the chamber as depicted in FIG. 1. The improvement being the increased efficiency of the condenser as noted by a more uniform ice buildup around the entire condenser tube and a greater condensing capacity for a given flow of refrigerant through the tubes. The improvement is surprisingly achieved by mechanically limiting the free discharge of liquid from the condenser tubes. Thus, in the straight horizontal condenser tube the liquid may be visualized as flowing only along the bottom of the tube, while in the condenser of this invention the liquid level must buildup within the tubes prior to discharge.

The condensing tubes are held by tube supports which are mounted at the sides of the chamber. These tube supports may be shaped such that they are in intimate contact with the chamber wall. As indicated later, contact between the chamber wall and the tube supports is utilized when a baffle plate is installed.

The condensing tubes are arranged in sets and a set consists of several vertical rows of condensing tubes. The tubes within a row can be uniformly spaced from top to bottom. Alternatively, the spacing between tubes within a row can be varied, e.g. the spacing between the tubes at the upper and lower ends of the row being closer than at the center of the row. Such an arrangement may be desirable in order to completely trap water vapors and prevent them from flowing to the vacuum outlet line. In all cases, the spaces must be of sufficient magnitude to accommodate a desired buildup of ice around the condenser tubes. An ice buildup of about ½ inch is preferred thickness for design of the spacing.

In order to increase the efficiency of the condenser and prevent water vapors from reaching the vacuum line, adjacent rows of tubes are staggered such that a horizontal line drawn through the center of a tube in one row will pass through the vertical space between two tubes in an adjacent row. It is advantageous for the outlet duct for non-condensable vapors to be situated such that the opening in the wall of the chamber is behind the condenser tubes as shown in FIG. 2 by 14.

In order to further increase the efficiency of the condensers and to prevent water vapors from entering the vacuum system and fouling the vacuum pump oil, a secondary condensing zone may be created by inserting a baffle plate vertically between two rows of condenser tubes as shown by 12 in FIG. 2. When utilizing a baffle plate the tube supports are preferably in intimate contact with the walls of the chamber and the baffle plate should extend longitudinally to make contact with the tube supports. In this manner, a secondary condensing zone is created by the wall of the chamber, the tube supports and the baffle. Any water vapors which are pulled toward the vacuum outlet are thus exposed to this secondary condensing zone and are likely to be condensed before they can reach the vacuum outlet. Furthermore, it is theorized that the baffle creates a pressure drop between the vacuum outlet and the chamber thus reducing the amount of vapors pulled toward the vacuum pump and improving the efficiency of the condenser by allowing a uniform load across the entire length of the chamber. It has been found that the baffle plate should preferably extend vertically past from ⅓ to ⅔ of the tubes in adjacent rows. The opening for the vacuum duct should be located above the secondary condensing zone as shown by 14 in FIG. 2.

Refrigerant is supplied to the condenser tubes by risers, one of which is shown as 18 in FIG. 3. The risers are connected to the inlet end of the feed tubes 19 and these feed tubes carry the entering refrigerant to the front end of the condenser tubes 4 as shown in FIG. 3. A mixture of gaseous and liquid refrigerant is discharged from the condenser tubes into an outlet riser 9 and then through refrigerant piping to a compressor system. The feed tubes have been found to be particularly advantageous as the openings can be significantly larger than holes in an orifice plate normally used to feed refrigerant lines and significantly reduce shutdowns due to plugged orifices caused by specks of metal or pieces of ice formed by water which might be in the refrigerant system. Preferably, the internal diameter of the feed tubes is at least ⅛ inch.

A set of condenser tubes as described with the tubes extending longitudinally in the chamber were shown in pending U.S. application S.N. 668,229 and they were shown to give improved performance in that shutdowns were minimized and condensation rates per volume of space utilized in the chamber were significantly increased as compared to internal plate condensers. However, the condenser tubes were still found to have an ice distribution that was not completely uniform, and there was a growing need to increase still further the condensing capacity per volume of chamber utilized as condenser space.

Many efforts were made to improve the efficiency of the condenser tubes. The internal surface of the tube was roughened by scoring the surface. The tube was threaded internally to create a roughened surface. Turbulizers in the form of coils and screens were inserted at the inlet of the condenser tubes. These and various other standard techniques were found to have no noticeable effect on the efficiency of the condenser tubes.

Unexpectedly, it was discovered that if the condenser tubes were installed on an angle such that the discharge end of the tube was elevated with respect to the inlet end of the tube the efficiency and capacity of the tubes were significantly increased. This improvement was shown by the fact that the ice buildup around the tube was more uniform and by the fact that for a given flow rate of refrigerant the condensing load could be significantly increased while maintaining a uniform ice buildup around the tubes.

It has been theorized that the improvement is caused by more uniformly wetting the internal surface of the condenser tube with liquid refrigerant. However, the slanted tubes worked where other methods failed because the angle of the tube caused more liquid to be retained in the tubes and the boiling of the refrigerant created enough turbulence to wet the walls of the tubes, while standard techniques for creating more turbulence failed because there was insufficient liquid refrigerant in the horizontal tubes to wet the walls uniformly. Thus, it is apparent that some means of increasing the amount of liquid within the condensing tubes is necessary. Inclining the tubes as shown in FIG. 3 is one method of accomplishing the desired goal. Obviously, other methods of accomplishing the same goal become readily apparent such as inserting a weir at the discharge end of the tubes as shown in FIG. 4 or shaping the tubes such that there is a rise in a vertical direction at the discharge end of the tubes as shown in FIG. 5. Each of the aforementioned methods and variations thereof will have the effect of increasing the liquid level in a condenser tube and may collectively be referred to as liquid level pipe dams.

When utilizing the concept of installing the tubes on an incline, it was difficult to determine the effectiveness of the changes by measuring the buildup of ice. However, it was found that temperature measurements of the surface of the condenser tube could readily be related to ice thickness. Thus, if the surface of the condenser at one point was high as compared to other points, the ice thickness at the end of a drying cycle at the high point would be less than at other points on the condenser. When checking horizontal, straight condenser tubes it was found that the temperatures at the top surface were consistently about 10° F. higher than the temperatures at the side and bottom of the tubes. Also, there was a difference in temperature noted along the upper surface of the tubes. Thus, in a tube length of about 19 feet the top surface temperature at the discharge end was found to be from 10 to 20° F. warmer than the top surface temperature at the center of the tube.

When the condenser tubes were installed on an angle such that the discharge end of the tube was elevated as compared to the inlet end, the temperature differences between the upper and lower surfaces of the tube and across the length of the tube were found to decrease significantly and it was observed that as the surface temperatures were more uniform, the ice buildup on the tubes were more uniform. A large angle of incline, e.g. 45° from the horizontal, would be expected to give uniform surface temperature across the entire tube. However, in order to install as many tubes as possible in a given volume, without resorting to a complicated arrangement of feed and discharge risers, it would be most desirable to install the tubes at the smallest possible angle. It was found that if the difference in height between the inlet and outlet ends of the tubes was ¾ of a pipe diameter, no significant improvement in ice distribution was achieved. When the incline was increased to about 1.75 pipe diameters the variations in surface temperature along the surface of the tubes were significantly decreased. Thus, a preferred incline would be from about 1 to 10 pipe diameters as the full benefit of decreased temperature would be realized and the mechanical installation of the tubing would be as readily accomplished as with horizontal tubes.

While it is possible to increase tube wetting by resorting to a smaller tube diameter for a given flow of refrigerant, this is not a satisfactory approach as compared to the liquid level pipe dams of this invention. Inherent in such an approach would be higher pressure drops across the tubes which would be associated with higher refrigeration temperatures and consequently higher chamber pressures. Also, to obtain the same amount of condenser surface area would require the use of more tubes, which would mean more complicated and expensive manifolding.

The advantages of the liquid level pipe dams will be more fully understood by reference to the following examples.

Example I

A 19 foot long, 1 inch stainless steel schedule 10 pipe was wrapped in a heating element such that a uniform heat load could be induced along the entire tube. The tube was connected to a refrigeration inlet and outlet header in a vacuum freeze drying chamber. Thermocouples were placed on the surface of the tube, at the middle of the tube and at the discharge end of the tube, on the upper and lower surfaces. A heat load expressed as tons of refrigeration was induced and the refrigerant was circulated through the tube at a controlled rate. The angle of incline was varied and the surface temperatures recorded as ° F. above the boiling point of the refrigerant. The following results were obtained:

| Run No. | Load, tons | Flow, lb./m. | Slope, inches | Center temperature, ° F. | | End temperature, ° F. | |
|---------|-----------|--------------|---------------|------|--------|------|--------|
|         |           |              |               | Top  | Bottom | Top  | Bottom |
| 1       | 0.5       | 5.5          | 0             | 19   | 4      | 14   | 0      |
| 2       | 0.5       | 5.5          | ¾             | 22   | 5      | 15   | 2      |
| 3       | 0.5       | 5.5          | 2             | 10   | 2      | 0    | 0      |
| 4       | 0.5       | 7.0          | ¾             | 12   | 1      | 12   | 1      |
| 5       | 0.5       | 7.0          | 2             | 2    | 2      | 0    | 0      |
| 6       | 0.7       | 7.0          | 1¾            | 2    | 2      | 2    | 0      |

It may be readily observed from runs 1, 2 and 3 that a slope of ¾ inch gave no improvement in surface temperature variation, while a slope of 2 inches gave significant improvement even though the surface temperature at the top, center was still elevated as compared to the bottom temperature.

In runs 4 and 5 the refrigerant flow rate was increased from 5.5 lbs./m. to 7.0 lbs./m. The results of run 4 as compared to run 2 show that the increase in flow rate helped to decrease the surface temperatures at the top of the tube, but differences between the top and bottom surfaces were still about 10° F. However, when the slope was increased from ¾ inch to 2 inches in run 5 the differences in surface temperature were essentially eliminated.

Run 6 shows that the tonnage per tube can be increased at the proper incline without increasing the flow of refrigerant and without causing a significant variation in surface temperatures. This result is very significant as it shows that the inclined condenser tubes are capable of handling larger condensation loads. Also, when comparing runs 3 and 4 it is apparent that for a given variation in surface temperature the amount of refrigerant which must be pumped through the condensers is less when the tubes are inclined sufficiently thus allowing a more economical operation with inclined tubes.

Example II

In a cylindrical chamber, two sets of condenser tubes were mounted as shown in FIG. 2. The condensing tubes were 1 inch stainless steel schedule 10 pipe arranged in seven vertical rows. The lateral spacing between the inner rows including the center row was 2¹⁹⁄₃₂ inches and the lateral spacing between the outer rows including the center row was 1⅞ inches. The tubes within a row were uniformly spaced at center to center distance of 3 inches. The refrigerant inlet and outlet risers were arranged as shown in FIGS. 2 and 3 and the feed tubes had an internal diameter of ⅛ inch. The condenser tube supports were spaced at intervals of 3½ feet and a baffle plate was inserted between the outer two rows of condenser tubes extending down from the wall of the chamber past half of the condenser tubes in the adjacent rows and extending longitudinally between two tube supports. The tubes were installed on an incline such that the discharge end of the tubes were 1¾ inches higher than the inlet ends of the tubes. A batch of particulate frozen coffee extract was placed in the drying chamber, the chamber door was closed, the chamber evacuated to a pressure of less than 1 millimeter of mercury and heat was applied to the frozen extract under controlled conditions in order to vacuum freeze-dry the coffee solids.

The condenser efficiently handled water vapor condensation rates in excess of 700 pounds of water per hour. The surface temperature of the condenser tubes was essentially uniform across the entire tube and ice buildup on the tubes was uniform.

The invention having thus been described, what is believed to be new and desired to be protected by a Letters Patent is described in the appended claims.

What is claimed is:

1. A vacuum freeze dryer comprising a vacuum chamber with a horizontal axis; a set of spaced, longitudinally extending vapor condensing tubes mounted in said chamber at each side of the chamber; the tubes in said set arranged in laterally spaced vertical rows, the tubes in adjacent rows being staggered; the sets being laterally spaced to receive a product loaded car; means for refrigerating said condensing tubes; means for removing non-condensable vapors from said vacuum chamber to a vacuum source; and a liquid level pipe dam to maintain a desired minimum level of liquid refrigerant in the condensing tubes.

2. The freeze dryer of claim 1 wherein the liquid level pipe dam consists of mounting the tubes on an incline such that the discharge end of the tubes is elevated from the horizontal, the elevation being at least one tube diameter and the elevation being restricted such that the condenser tube does not form more than a 45 degree angle with the horizontal.

3. The freeze dryer of claim 2 wherein the elevation of the discharge end of the condensing tubes from the horizontal is from 1 to 10 tube diameters.

4. The freeze dryer of claim 1 wherein the liquid level pipe dam consists of a weir mounted in the discharge end of the condenser tube.

5. The freeze dryer of claim 1 wherein the liquid level pipe dam consists of a vertically extending bend in the condensing tube at the discharge end of the tube.

6. The freeze dryer of claim 1 wherein a baffle plate is mounted vertically between two rows of tubes, said baffle plate extending vertically down from the top of the vacuum chamber past from one-third to two-thirds of the condensing tubes in adjacent rows, said baffle plate extending longitudinally parallel to the condensing tubes, the condensing tubes in a set between said baffle plate and the center of the chamber being a primary condensing zone, the condensing tubes between said baffle plate and the wall of the chamber being a secondary condensing zone, and said means for removing non-condensable being in the form of a pipe, said pipe having an opening situated at the top of the vacuum chamber above the tubes of said secondary condensing zone.

7. The freeze dryer of claim 6 wherein said baffle plate extends longitudinally the full distance between two adjacent tube supports and wherein the tube supports are in intimate contact with the wall of the vacuum chamber.

8. The freeze dryer of claim 7 wherein the refrigerating means for the condenser tubes comprise liquid risers, feed tubes connecting said risers, and inlets on said connecting tubes, the minimum internal diameter of said feed tubes being ⅛ of an inch, and outlet risers for conveying refrigerant to a vapor liquid separator.

9. The freeze dryer of claim 6 wherein the liquid level pipe dam consists of mounting the tubes on an incline such that the discharge end of the tubes is elevated from the horizontal, the elevation being at least one tube diameter and the elevation being restricted such that the condenser tube does not form more than a 45 degree angle with the horizontal.

10. The freeze dryer of claim 9 wherein the elevation of the discharge end of the condensing tubes from the horizontal is from 1 to 10 tube diameters.

11. The freeze dryer of claim 8 wherein the liquid level pipe dam consists of mounting the tubes on an incline such that the discharge end of the tubes is elevated from the horizontal, the elevation being at least one tube diameter and the elevation being restricted such that the condenser tube does not form more than a 45 degree angle with the horizontal.

12. The freeze dryer of claim 11 wherein the elevation of the discharge end of the condensing tubes from the horizontal is from 1 to 10 tube diameters.

References Cited

UNITED STATES PATENTS

| | | | |
|---|---|---|---|
| 665,912 | 1/1901 | Jolicard | 165—142 |
| 1,994,037 | 3/1935 | Gay | 62—218 |
| 2,611,584 | 9/1952 | Labus | 165—142 |
| 2,626,783 | 1/1953 | Fritzberg | 165—142 |
| 3,443,324 | 5/1969 | Ludwig | 34—92 |

WILLIAM J. WYE, Primary Examiner

U.S. Cl. X.R.

62—425, 268; 165—142